United States Patent
Bose

(10) Patent No.: US 8,266,472 B2
(45) Date of Patent: Sep. 11, 2012

(54) METHOD AND SYSTEM TO PROVIDE HIGH AVAILABILITY OF SHARED DATA

(75) Inventor: Patrick Glen Bose, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 257 days.

(21) Appl. No.: 11/460,949

(22) Filed: Jul. 28, 2006

(65) Prior Publication Data

US 2007/0294563 A1 Dec. 20, 2007

Related U.S. Application Data

(60) Provisional application No. 60/746,351, filed on May 3, 2006.

(51) Int. Cl.
*G06F 11/00* (2006.01)

(52) U.S. Cl. ...................... 714/4.11; 714/6.21

(58) Field of Classification Search ............. 714/4, 4.11, 714/6.21
See application file for complete search history.

(56) References Cited

U.S. PATENT DOCUMENTS

| 6,701,449 | B1* | 3/2004 | Davis et al. .................. 714/4.11 |
| 7,055,056 | B2* | 5/2006 | Bessire ............................. 714/6 |
| 7,127,633 | B1* | 10/2006 | Olson et al. ....................... 714/4 |
| 7,240,234 | B2* | 7/2007 | Morita et al. ..................... 714/4 |
| 7,299,290 | B2* | 11/2007 | Karpoff ........................ 709/231 |
| 2002/0069324 | A1* | 6/2002 | Gerasimov et al. ........... 711/114 |
| 2002/0188711 | A1* | 12/2002 | Meyer et al. .................. 709/223 |
| 2003/0005125 | A1* | 1/2003 | Berthaud et al. .............. 709/226 |
| 2003/0018927 | A1* | 1/2003 | Gadir et al. ....................... 714/4 |
| 2005/0028028 | A1* | 2/2005 | Jibbe ................................. 714/6 |

OTHER PUBLICATIONS

McMillan, Jr. et al. 'Fault Tolerant, High Availability Network Appliance'. 2000. Incorporated by refence U.S. Appl. No. 09/552,781.*

* cited by examiner

*Primary Examiner* — Yolanda L Wilson

(74) *Attorney, Agent, or Firm* — Schwegman, Lundberg & Woessner P.A.

(57) ABSTRACT

A data storage system and method are described. The system may comprise a data repository to store data, and first and second storage controllers. The first and second storage controllers may be connected via at least one network device to the data repository. One or more clients may be connected to the first storage controller and to the second storage controller to access the data in the data repository via the first and second storage controllers. The second storage controller may be configured to at least partially inhibit network connectivity of the first storage controller if the first storage controller at least partially fails. The system may include a Storage Area Network providing the data repository, each of the first and second storage controllers being connected to the Storage Area Network via switch. Each switch comprises at least one fiber channel gateway and at least two Target Channel Adaptors.

20 Claims, 9 Drawing Sheets

METHOD AND SYSTEM TO PROVIDE HIGH AVAILABILITY OF SHARED DATA

RELATED APPLICATIONS

This patent application claims the benefit of priority, under 35 U.S.C. Section 119(e), to U.S. Provisional Patent Application Ser. No. 60/746,351, filed on May 3, 2006, the entire content of which is incorporated herein by reference.

FIELD

The present invention relates generally to high availability of shared data.

BACKGROUND

A Storage Area Network (SAN) is a sub-network of shared storage devices. SAN's architecture works in a way that makes all storage devices available to all servers on a Local Area Network (LAN) or Wide Area Network (WAN). As more storage devices are added to a SAN, they become be accessible from any server in the larger network. SANs are used by applications (e.g., business applications) to store large volumes of data.

Enterprise applications aim at providing reliable service with transparent fail-over that is scalable as well. High Availability has become a critical requirement for enterprises and failures should be almost transparent to end users. In addition, mechanisms should be put in place to allow system maintenance without disrupting the current workload.

Virtual servers may be used to make more efficient use of physical servers. A virtual frame or server management system may manage virtual servers and, when a virtual frame management system is deployed, it becomes a critical component in a data center. As such, if the virtual frame management system fails, any systems that are using the virtual servers could probably also fail. To maintain availability of the virtual frame management system, factors such as runtime state, persistent state, data plane, control plane, and minimization of failover time need to be properly addressed.

The runtime state of a virtual frame management system is information that is not stored persistently, typically due to the nature of the data and/or the rate at which it changes, coupled with the cost of using persistent storage. The persistent state relates to information which is stored on media and is capable of being recovered after a power cycle. The data plane and control plane refer to a relationship between the managed system and the manager. Minimization of failover time includes downtime associated with the managing system handling and recovering from a failure of the virtual frame management system.

Typically, one approach to maintaining high availability of a virtual server system uses a replicated state. This approach involves a multi-tiered architecture, where each tier is responsible for its own availability and for being able to detect and route around failures in any of the other tiers. In a real-time replicating system, any changes in state to one manager are propagated to the other manager (this assumes two managers exist for redundancy). This can exist in an active-active or active-standby scenario. With this approach, the system needs two data stores, each with copies of the data of both managers.

However, real-time replication involves a great deal of complexity as transactions have to be distributed across multiple systems. For example, there are associated complexities involved in the recovery workflows to bring a failed manager back in synchronization with the rest of the system. Also, there is a cost in terms of performance to do this replication.

Another approach uses clustered file systems. This approach utilizes a shared storage system, where the applications or file systems on the managers are capable of simultaneously accessing the same storage device. In this case, there is one copy of the data that is accessible from multiple machines.

Clustered file systems involve additional cost. For example, to support one specific manager, only one file system can be used, which might not agree with the file systems of other network components. Also, there is a compatibility issue of obtaining database software that is compatible with the chosen file system.

BRIEF DESCRIPTION OF THE DRAWINGS

Example embodiments are illustrated by way of example, and not limitation, in the figures of the accompanying drawings, in which like reference numerals indicate the same or similar features unless otherwise indicated.

In the drawings.

DETAILED DESCRIPTION

Figure 1:
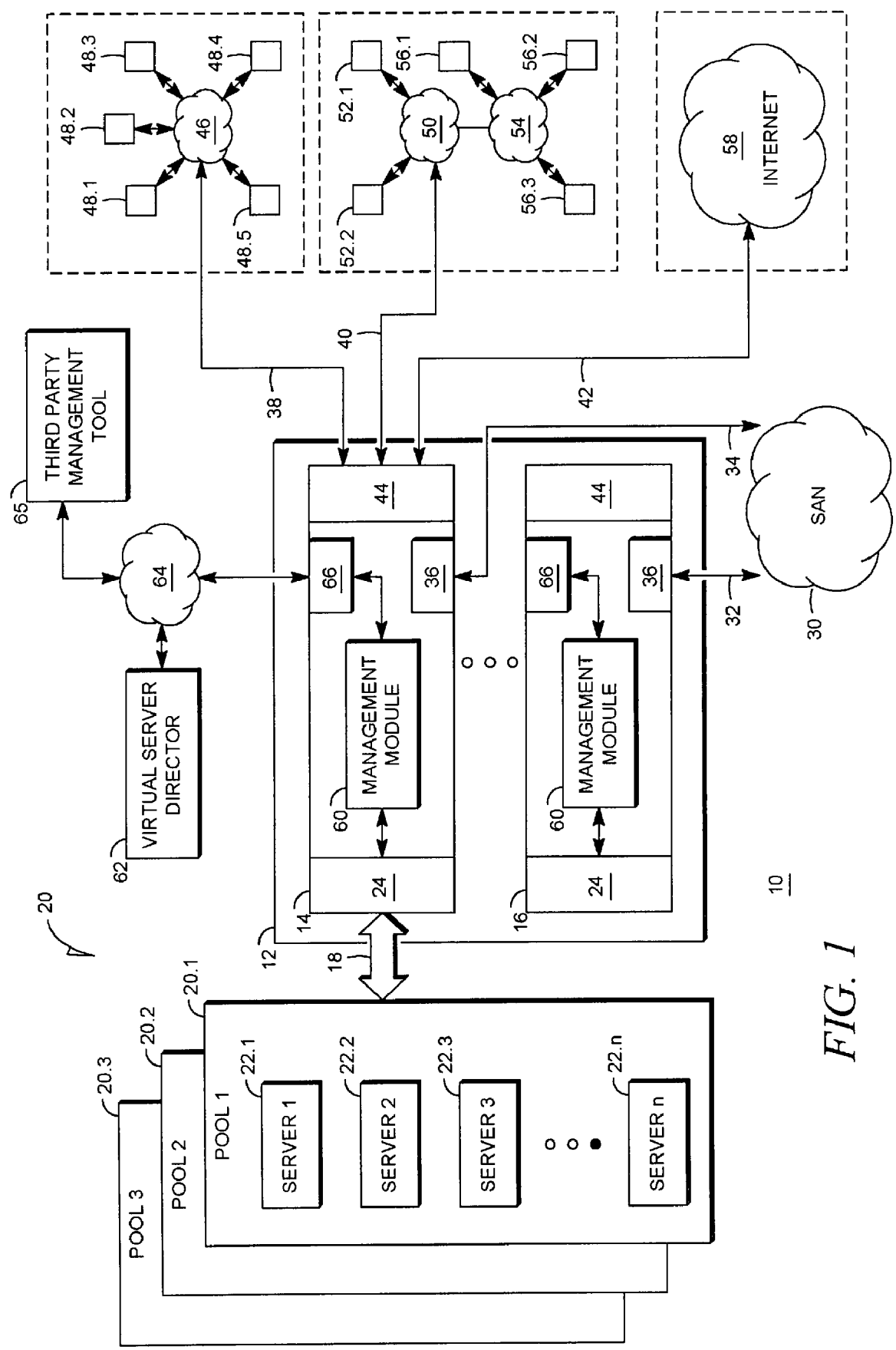
FIG. 1 shows example architecture of a virtual server system in accordance with an example embodiment.

A method and a system to provide high availability of shared data in a data repository are described. The data repository may be a distributed repository including a single or multiple storage devices (e.g., centrally located or geographically distributed). In order to provide high availability to the shared data, two or more management stations may be provided to manage at least one storage device. In an example embodiment, as described in more detail below, an active storage controller and a standby storage controller may be provided to control or manage one or more storage devices. In accordance with an example embodiment, when the active storage controller malfunctions, the standby controller may disable the active controller at a network level (as opposed to a storage media or server level) and assume control of the shared data. For example, the standby storage controller may "fence off" the active controller from the network by reconfiguring one or more network switches. In the example embodiments described herein the terms "active", "master", "standby" and "slave" are used to distinguish between two storage controllers. The storage controllers could also be referred to as fist and second storage controllers each of which may selectively assume the role of an active or operational storage controller when the other storage controller malfunctions. When assuming an active role, the storage controller may transition from a passive or standby role to the active role.

Example Deployment in InfiniBand and Fibre Channel Gateway Environment

In an example embodiment, each host may have one or more InfiniBand Host Channel Adaptors (HCAs) connected to one or more InfiniBand switches connected to one or more Fibre Channel (FC) gateways connected to a Storage Area Network (SAN). In order to allow a host access to a storage device on the SAN, the FC gateway must be properly configured. An initiator must be created on the gateway by specifying a Globally Unique Identifier (GUID) of the HCA and extension, and the FC addresses (World Wide Node Name (WWNN) and World Wide Port Names (WWPN) to use. Once the initiator has been created, the gateway can discover storage visible to this initiator. Policies can then be set to control access by the host to the discovered targets and Logical Units (LUs). In order to restrict access, a master host may delete any initiators associated with the standby host (e.g., initiators identified by the GUIDs of the HCAs contained in a standby storage controller). To grant access to a master storage controller, the master storage controller can create initiators for itself and configure the storage access policies to allow it to access the desired storage resources.

Example Network Configuration to Restrict or Grant Access in Alternative Deployment Scenarios In an example embodiment, each host may have one or more fibre channel HBAs connected to one or more fibre channel switches to access storage on a SAN. The master storage controller may control access to the storage resource through the zoning configuration on the FC switches and/or the LUN masking configuration on the storage array. In order to restrict access by the standby storage controller, the master storage controller may remove the addresses of the standby controller from all zones which would give the standby controller access to the storage. In addition or instead, the master storage controller may remove all LUN masking rules which would give the standby storage controller access to the storage. Similarly, the master storage controller may ensure that its addresses were included in the zone which also contained the desired storage and that LUN masking rules were in place granting access from the master to the desired storage. This may be implemented by controlling the zoning and/or the LUN masking.

In an example embodiment, each host may have one or more Ethernet NICs attached to one or more Ethernet switches to access a Network File System (NFS) server. The master storage controller may control access to the storage resources through a Virtual Local Area Network (VLAN) configuration on the switches. A VLAN could be created on the Ethernet switches including switch ports to which the hosts and the NFS server may be connected. To restrict access to the storage by the standby storage controller, the master storage controller may remove the ports to which the standby is connected from the VLAN to prevent the standby storage controller from communicating with the NFS server. Likewise, the master storage controller may ensure the port to which it is connected is a member of the VLAN. In an example embodiment, the same methodology may be used if the host accesses the storage using iSCSI.

Further, it will be clear to a person of skill in the art that all the above example methods may be combined in a more complex system where hosts had multiple IO interfaces and/or utilized multiple IP and/or FC attached storage devices. For example, in addition to IB deployment, zoning and lun masking may be configured, since the FC gateways may often be attached to FC switches and storage arrays. Likewise, Ethernet gateway modules 44 may be connected to Ethernet switches. Additionally, IPoIB (IP over InfiniBand) communication could be allowed or restricted between storage controllers and IP storage devices by adding or removing the storage controllers from InfiniBand partitions.

Example embodiments may provide high availability of persistent data stored in a data repository (local or distributed), and may ensure controlled access of the persistent data to multiple storage controllers (e.g., virtual frame directors in a virtual server deployment) over the network. The availability of the persistent data is provided to any storage controller (e.g., virtual frame director) by dynamically remapping the network connections to the data repository.

Example embodiment of the methods, devices and systems may be deployed in a virtual server system. However, it is to be noted that the example embodiments are not restricted to this deployment.

Example Virtual Server Environment

In an example embodiment, active and standby storage controllers are described herein as being deployed in a virtual server environment. For example the active and standby storage controller may be virtual frame directors or controllers that provide high availability to a SAN. The method and system may use access to network-based storage devices to automate the high availability process. It will be evident, however, to one skilled in the art that the present embodiments may be practiced without these specific details. Further, although the example embodiments are described as being deployed in a virtual server environment, it should be noted that the methodology for providing high availability described herein may be deployed in any management system and is not restricted to a manager for a virtual server system. Accordingly, references to virtual servers are to be regarded in an illustrative rather than a restrictive sense.

Referring to FIG. 1, reference 10 generally indicates a virtual server system (herein referred to by way of example as "VFrame") with associated hardware on which the virtual servers are deployed. The virtual server system allows server personalities to be assigned to generic static servers over a server fabric switch. In an example embodiment, as the server personality is separated from the physical structure, it may be possible to provision virtual servers on-demand out of industry standard components. Each virtual server deployed on a physical server defines a state or personality of a physical server. This may include the logical definitions and configuration information stored in and used by a virtual frame director (described by way of example in more detail below) to program a server fabric as well as an OS and applications of the virtual server. The state or personality of the physical server may be stored on a logical unit on a Storage Area Network, as described in more detail below. Thus, in FIG. 1, the example physical servers 22.1-22.n are the physical devices on which one or more virtual servers run. These physical servers include the CPU, memory, IO devices, and the like.

The system 10 is shown, by way of example, to include a switch group 12 including one or more switches 14, 16. The switch group 12 is connected, for example, via an InfiniBand link 18 to one or more physical server pools 20. By way of example, three physical server pools 20.1-20.3 (on which the virtual servers are deployed) are shown in FIG. 1 but it will be appreciated that any number of server pools may be provided and that each server pool may have a different number of server blades, racks, or the like. Each server pool 20.1-20.3 is shown to include a plurality of physical servers 22.1-22.$n$ linked via one or more InfiniBand links 18 to the switch group 12. Accordingly, when the link 18 is an InfiniBand link, each switch 14 may include an InfiniBand interface 24 to interface the server pools 20.1-20.3 to the switch group 12. The InfiniBand architecture or link may define a high speed network for interconnecting processing nodes and I/O nodes. In an InfiniBand network, processing nodes and I/O nodes are connected to the fabric by Host Channel Adapters (HCAs) and Target Channel Adapters (TCAs). It will however be appreciated that, in addition to or instead of, the InfiniBand link 18 other links may be provided.

Figure 2:
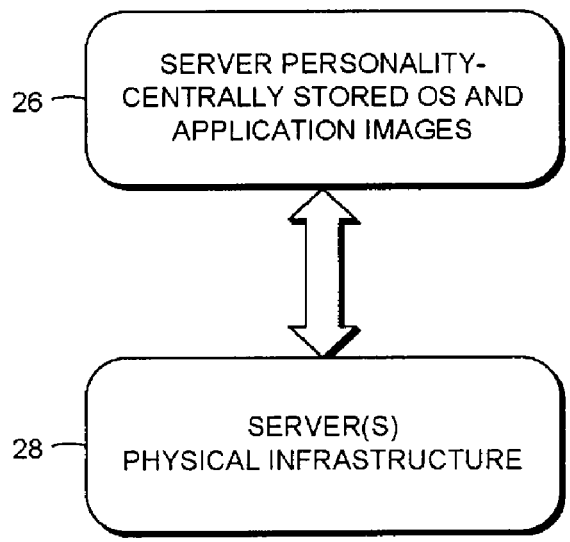
FIG. 2 shows separation of the physical infrastructure from the server personality of a server of the system of FIG. 1.

FIG. 2 shows that the personality of each server 22.1-22.$n$ is separated from the physical infrastructure (see blocks 26 and 28 in FIG. 2). For example, the personality of the servers 22.1-22.$n$ (e.g., the operating system (OS), application image (s), or the like) may be stored remotely from the physical server infrastructure on a Storage Area Network (SAN) 30. In this example, the physical server infrastructure can be stateless computational resources with CPUs and memory. For example, as shown in FIG. 1, the SAN 30 (including one or more databases) may be provided to operate in conjunction with the physical servers 22.1-22.$n$. It will be appreciated that the SAN 30 may be a distributed data facility dispersed geographically. In an example embodiment, the SAN 30 is connected to the example switches 14, 16 via fibre channel connections 32, 34. Accordingly, each switch 14, 16 may include a fibre channel gateway 36. It will however be appreciated that in other embodiments, the switches 14, 16 may communicate with the SAN 30 via other channels in addition to, or instead of, the fibre channel gateway. The personalities or state of the virtual servers may be stored in a local database or on the SAN 30.

The switch 14 is shown to communicate with plurality of different networks (Local Area Networks, Wide Area Networks, or the like) via communication links 38, 40, 42. For example, the communication links 38, 40, 42 may be Ethernet connections and, accordingly, each switch 14, 16 may include one or more Ethernet gateways 44 (e.g., network interface cards or NICs). In the example system 10, the communication link 38 is shown to connect to a network 46 interconnecting a plurality of hosts 48.1-48.5. The hosts 48.1-48.5 may form part of another data network, or be any other network host.

The switch 14 is also shown to communicate via the communication link 40 to a network 50 which may, for example, be an enterprise network. The network 50 is shown to communicate with desktop computers 52.1-52.2 and a subnet 54 which, in turn, is connected to desktop computers 56.1-56.3. Further, the switch 14 is also shown to connect via the communication link 42 to a network such as the Internet 58. It will however be appreciated that the aforementioned networks are merely example networks and different configurations and different numbers of networks and subnets may be provided that connect a wide range of network devices.

In an example embodiment, the system 10 may allow virtualization of servers deployed on physical servers that may be managed by a management module 60, which is shown, by way of example, to reside at the switch 14. It will, however, be appreciated that the management module 60 may reside in other components and that, in other example embodiments, the servers may not be virtualized. The management module 60 communicates with a virtual frame director 62 that controls the provisioning of the server pools 20.1-20.3. In an example embodiment, the virtual frame director 62 communicates via a network 64 with the management module 60. The system 10 also includes a third party management module 65 that communicates with the virtual frame director 62 and/or with the management module 60 to manage the provisioning of virtual servers. In an example embodiment, the network 64 is an Ethernet network and, accordingly, the switch 14 may thus include one or more Ethernet ports 66. It will however be appreciated that the various communication links linking the various components/devices in the system 10 are not restricted to InfiniBand connections, Ethernet connections, or the like. Any communication means may be provided to interconnect the various components.

Figure 3:
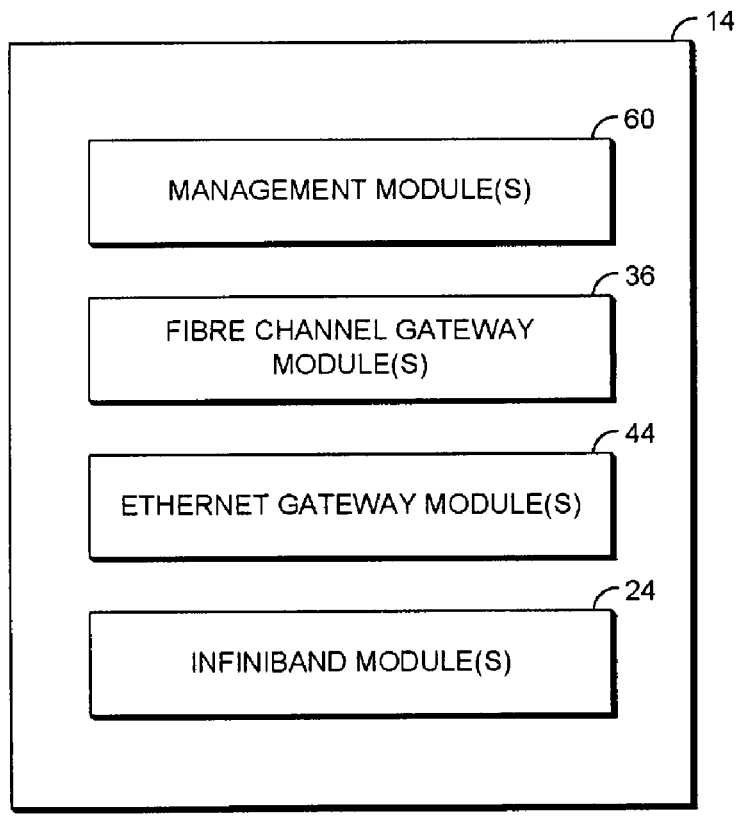
FIG. 3 shows a switch, in accordance with an example embodiment, deployed in the system.

Referring to FIG. 3, example modules of the switch 14 are shown. For example, the switch 14 is shown to include one or more management modules 60, one or more fibre channel gateway modules 36, one or more Ethernet gateway modules 44, and one or more InfiniBand modules 24. It will be appreciated that the modules 60, 36, 44, and 24 may include various electronic components to effect communication using the relevant protocols. In an example embodiment, the virtual frame director 62 of the system 10 allows software partners to program the switches 14, 16 with policies necessary to implement virtual servers on demand. For example, the third party management tool 65 may be used to accomplish this.

Figure 4:
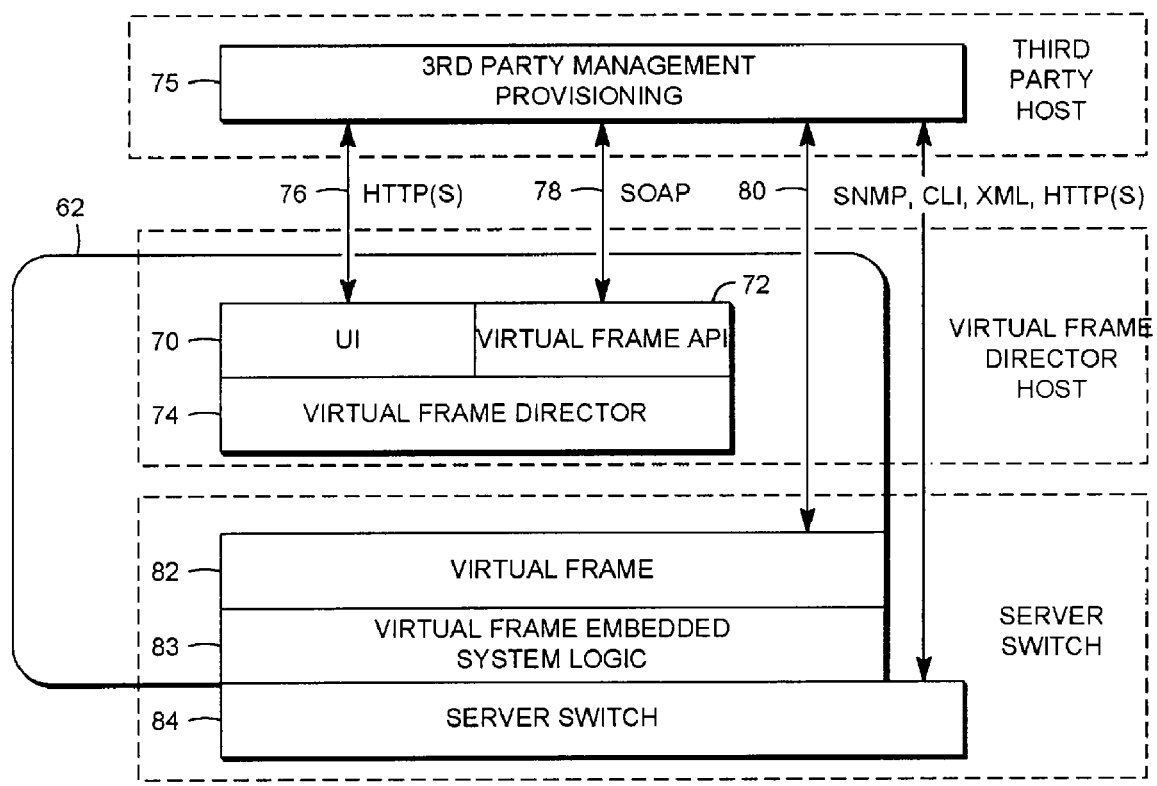
FIG. 4 shows example software architecture of a management module communicating with a third party management tool.

As shown by way of example in FIG. 4, logically the virtual frame director 62 (which may reside on a separate server) may include a user interface module 70, a virtual frame director Application Program Interface (API) 72 and a virtual frame (VFrame) director platform 74. The virtual frame director 62 may communicate with a third party management tool application 75 (see also third party management tool 65 in FIG. 1) via, for example, the network 64. In an example embodiment, the user interface module 70 communicates with the third party management and provisioning module 75 via an HTTP(s) link 76, a SOAP link 78, or the like. The third party management and provisioning module 75 is also shown to communicate via link 80 to a virtual frame platform 82. The server switch 14 is also shown to include embedded system logic 83 provided at a switch 84 (e.g., a switch 14, 16).

Figure 5:
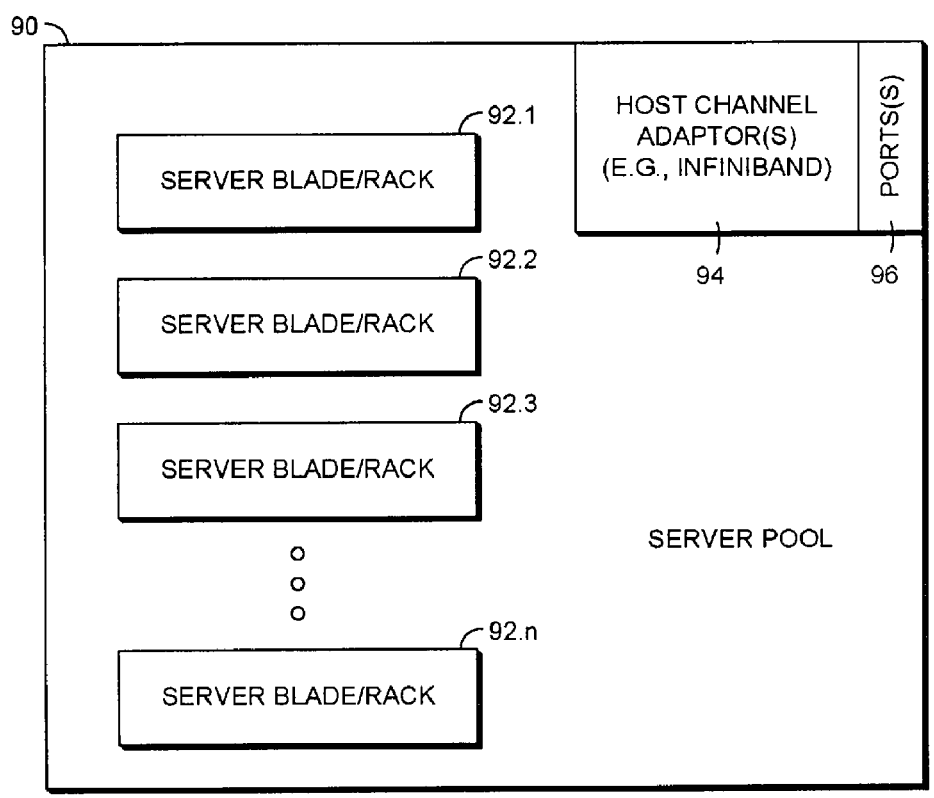
FIG. 5 shows a server pool, in accordance with an example embodiment, of the system of FIG. 1.

Referring to FIG. 5, reference 90 generally indicates an example server pool. The server pool 90 is shown to include a plurality of physical servers or server blades 92.1-92.$n$ which may, for example, each host one or more virtual servers. The physical servers 92.1-92.$n$ may correspond to the physical servers 22.1-22.$n$ in FIG. 1. In an example embodiment, in order to communicate via the communication link 18, each server pool 90 includes one or more host channel adapters (HCA) 94 (e.g., one or two HCAs per physical server) when deployed in an InfiniBand environment. Further, one or more ports 96 may be provided for communication via a further communication protocols or channels. As mentioned above, the servers 92.1-92.$n$ are physical servers. In will be appreciated that the virtual servers hosted on the physical servers may be defined by a network configuration/logical definitions stored in a database of the virtual frame director 62 and a state which is stored on networked storage.

Example High Availability Configuration

Figure 6:
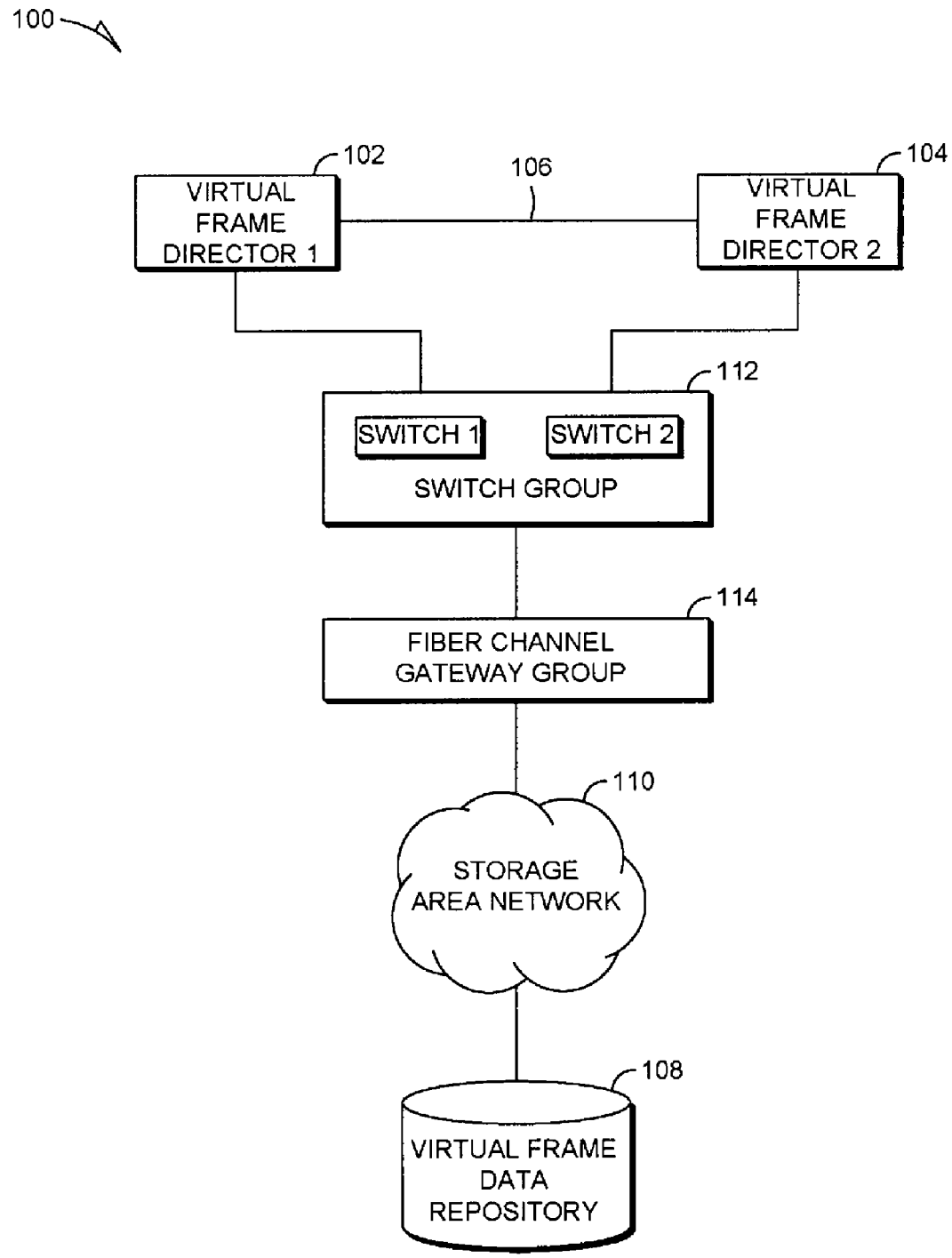
FIG. 6 shows a system, in accordance with an example embodiment, to provide high availability of shared data.

As mentioned above, in order to provide high availability to the shared data, two or more management stations may be provided to manage at least one storage device. FIG. 6 shows an example network 100 to provide high availability of shared data in which the storage management controllers are virtual frame directors in an example virtual server environment. The network 100 may form part of the system shown in FIG. 1. In an example embodiment, the network 100 uses dynamically mapped storage to allow failover between a set of virtual frame directors (or managers of a virtual server system in an example embodiment). As mentioned above, a virtual server environment is described merely by way of example and the example embodiments apply equally in other server environments.

For redundancy, two physical machines/computers may be provided which, in the example virtual server environment, include a virtual frame director 102 and a virtual frame director 104. The machines hosting the virtual frame directors 102 and 104 may each have local storage that contains copies of virtual frame director software (e.g., to configure network connections upon fail-over). In an example embodiment, included in the virtual frame director software is heartbeat functionality that may trigger a failover process. For example, through a connection 106 (e.g., a redundant connection) and the heartbeat functionality, the virtual frame director 102 may detect whether the virtual frame director 104 is operating correctly, or has failed to operate (e.g., malfunctions). Similarly, the virtual frame director 104 can detect whether the virtual frame director 102 is operating correctly. It should be noted that the terms "active" and "standby" should not be construed restrictively but denote a first and a second device where the first device (or second device) assumes control when the second device (or first device) malfunctions. It will be noted that the storage controller may also operate in a master and slave manner.

In a normal running/operating condition, one virtual frame director (e.g., the virtual frame director 102) may be active, and another virtual frame director (e.g., the virtual frame director 104) may be in a standby mode (e.g., functioning as a slave). The active virtual frame director may then process user requests. A cluster address or a virtual internet protocol (IP) address may then be assigned to the active virtual frame director. The standby virtual frame director may create a "recovery-ok" status file on its local storage if it detects a normally running active virtual frame director. Use of this status file will be described by way of example below.

In an example virtual server environment, the persistent state of the active virtual frame director may be stored remotely. For example, the persistent state can be stored in a virtual frame data repository 108, which is shown to be stored in a SAN 110. The active virtual frame director (the virtual frame director 102 in the given example), as part of its startup sequence, may configure the network 100 to provide access to the remote storage device (which is shown by way of example to host the virtual frame data repository 108) that includes the persistent state of the virtual frame director 102. For example, the virtual frame director 102 may establish connections through a switch group 112 and a fibre channel group 114 to the storage area network 110. The virtual frame director 102 may then establish a connection within storage area network 110 to the virtual frame data repository 108, so that the virtual frame director 102 has access to the persistent state stored on the network 110.

The information required to complete the startup sequence described above may be stored on the local storage of the individual virtual frame directors 102, 104. This information may be a limited amount of data containing the addresses and security credentials and attributes required to establish the connection described above. As the information is limited, it can be stored locally and replicated whenever the system is installed or the relevant information updated. The information may be created once at install time and may be updated relatively rarely and therefore the overhead of maintaining this information in replicated state across the virtual frame directors may be trivial.

Once the network 100 is configured to provide the virtual frame director 102 with access to the persistent state stored in the virtual frame data repository 108, the device containing the virtual frame data repository 108 is mounted and additional symbolic links are made such that applications on the active virtual frame director 102 requiring access to the persistent state stored on the virtual frame data repository 108 will have access. Thereafter, the applications may be started on the active virtual frame director 102. In example embodiments which do not include server virtualization, the aforementioned methodology may not be performed.

Figure 7:
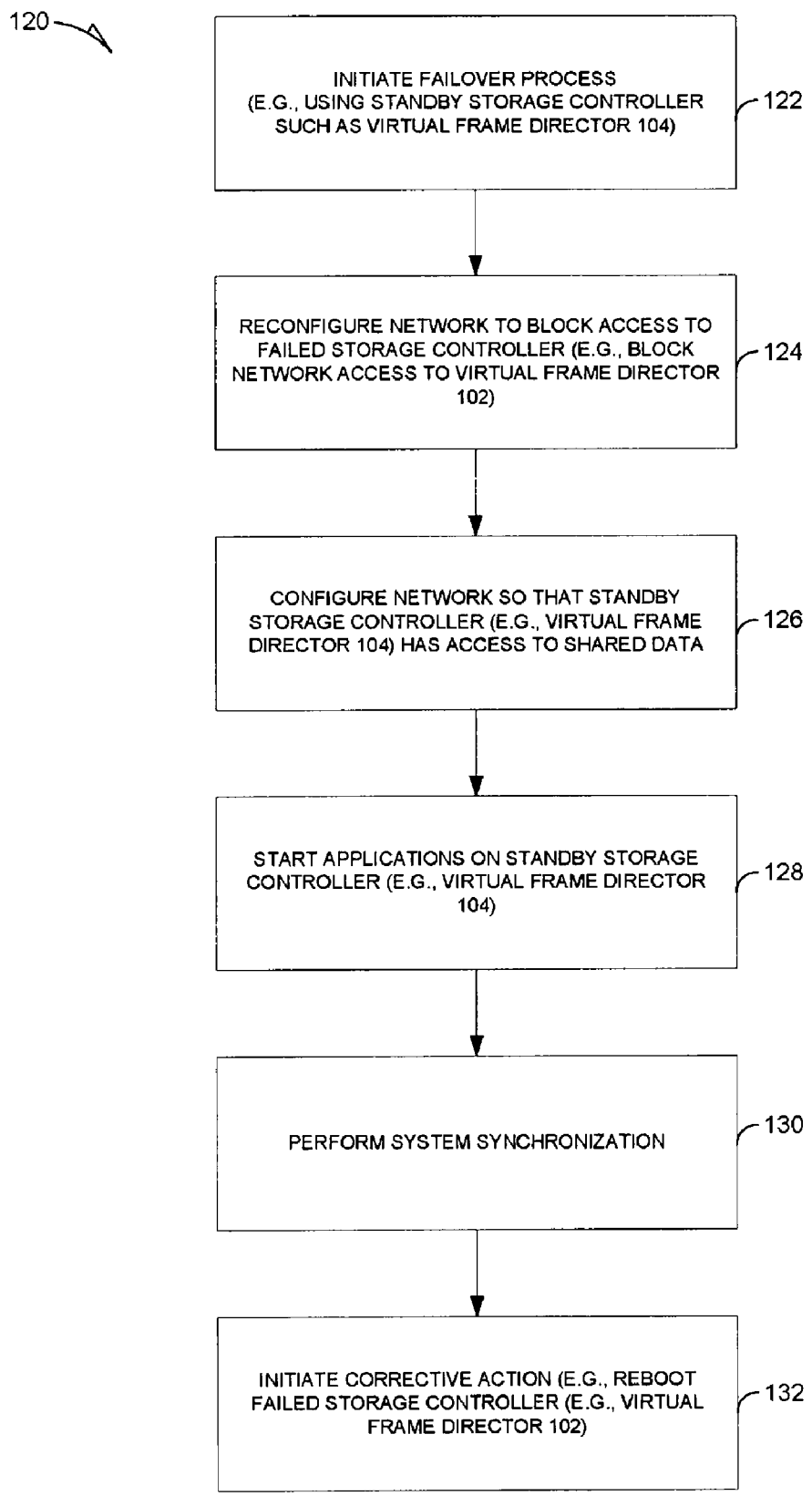
FIG. 7 shows a method, in accordance with an example embodiment, to provide high availability in a shared data repository.

A method 120, in accordance with an example embodiment, to provide high availability in a shared data repository is shown in FIG. 7. When a failure of the virtual frame director 102 is detected by the virtual frame director 104, a failover process begins (see block 122). In an example embodiment, the failover process may always be initiated by the standby virtual frame director 104. When a failure is detected, the standby virtual frame director 104 may reconfigure the network 100 to block access from the virtual frame director 102 to the virtual frame data repository 108 (see block 124). Once that is done, the virtual frame director 104 may configure the network 100 to provide it with access to the virtual frame data repository 108 (see block 126). Next, the device containing the virtual frame data repository 108 may mounted, and the appropriate symbolic links are made. Thereafter, the applications are started on the virtual frame director 104 (see block 128).

The virtual frame director application starts on the virtual frame director 104 and executes initial system synchronization which may attempt to resolve differences between the state in the data repository 108 and the state of the network 100 (see block 130). This may be done to clean up transactions that were in process and did not complete due to the failure of the virtual frame director 102. In an example embodiment, the virtual frame director 104 may restart any actions that did not complete. Thereafter, as shown at block 132 corrective action may be taken. For example, the virtual frame director 104 may use the "recovery-ok" status file to determine if it should attempt to the restart virtual frame director 102, to recover the virtual frame director 102 for use as a standby. When the virtual frame director 102 restarts, the high availability pair 102 and 104 will be back up, with the virtual frame director 104 now as the active controller and the virtual frame director 102 in standby mode. The active virtual frame director may delete the "recovery-ok" status file from its local storage.

In the event that the virtual frame directors 102 and 104 are unable to establish communications with each other, for example by a permanent disruption of connection 106, the "recovery-ok" status file may prevent unending repeated failovers due to the optional recovery of a failed director as described above by way of example. In this example scenario, after the first failover, the virtual frame director 104 may restart virtual frame director 102 as described above. When the virtual frame director 102 starts, the disrupted connection 106 may cause virtual frame director 102 to attempt to start as the active virtual frame director and initiate a second failover since no active virtual frame director can be detected. The "recovery-ok" status file will not exist on virtual frame director 102 since it never successfully started as a standby. As such, virtual frame director 102 will not attempt to restart virtual frame director 104 thereby stopping the failover cycle. It should be noted that this may be a rare scenario as the connection 106 is typically redundant and as such a total failure in this connection is unlikely. The "recovery-ok" status mechanism is an additional safeguard. Further, it should be noted that additional or other connections may be established between the virtual frame director 102 and the virtual frame director 104 (e.g., via the switch group 112).

Example Application Architecture

Figure 8:
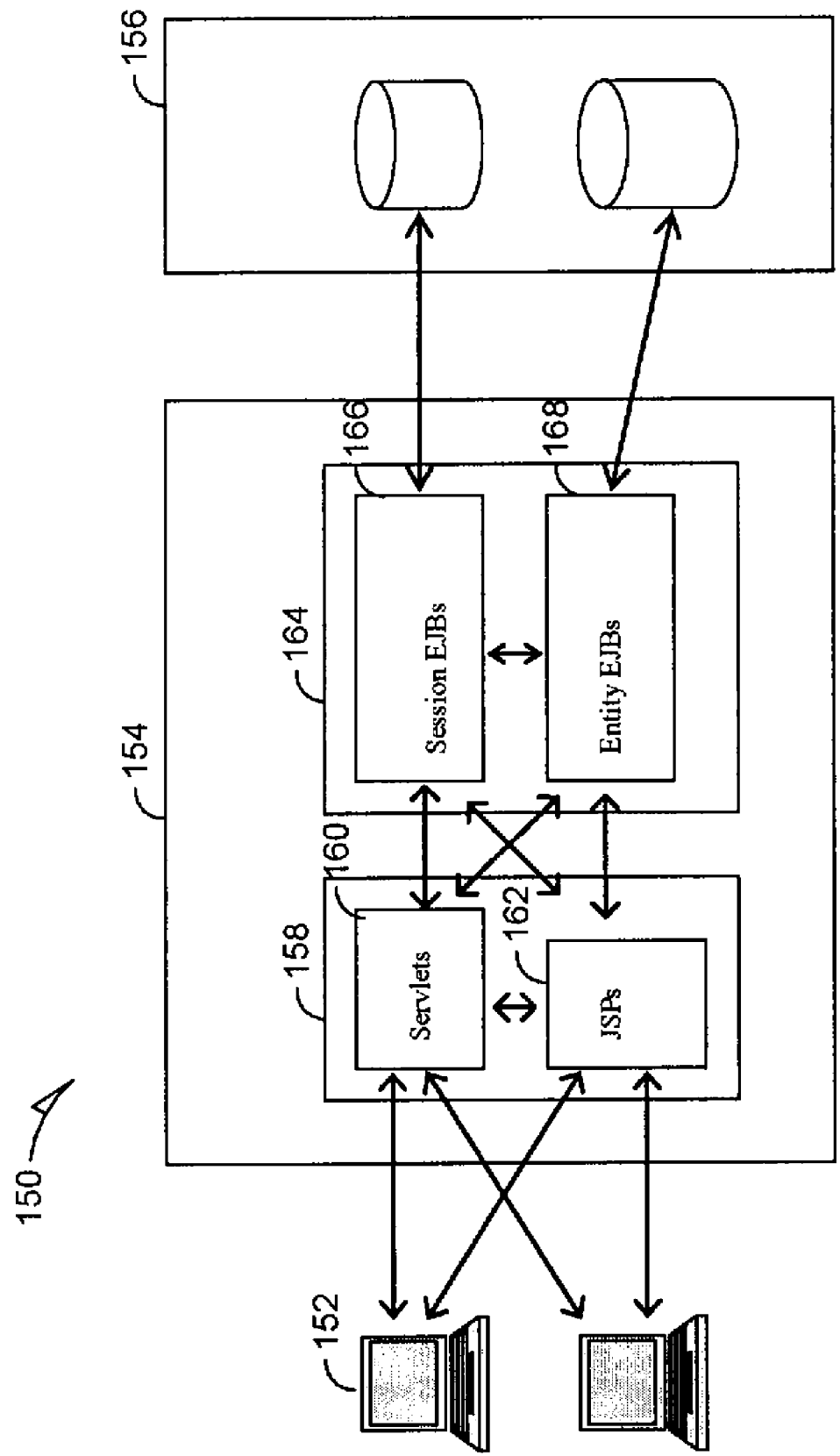
FIG. 8 shows application architecture, in accordance with an example embodiment, in which high availability of shared data may be provided.

FIG. 8 shows application architecture 150, in accordance with an example embodiment, in which high availability of shared data may be provided in, for example, a networked storage server environment. The example application architecture may be deployed in a non-virtualized or virtualized server environment. When deployed in a virtual server environment, various components of the application architecture 150 may correspond to the application architecture of the example virtual server system 10 shown in FIG. 1.

The application architecture 150 is shown to be deployed across web browser 152, a storage controller or manager 154 (e.g., a virtual Frame Director), and a database 156. Web components 158 are shown to include servlets 160 and Java Service Pages (JSPs) 162. Enterprise Java Beans (EJB) components 164 are shown to include session EJBs 166 and entity EJBs 168.

In an example embodiment, the application architecture 150 may be based on a three-tier architecture, where the Presentation, Business logic, and Database may form three distinct tiers. Server-side components may be used to model both the presentation and business logic of the system. In an example embodiment, a JBoss application server may be used. JBoss is an open source Java application server based on the Java 2 Platform Enterprise Edition (J2EE). The J2EE components that may be used include Session and Entity Enterprise Java Beans, Servlets and JSPs. PostgreSQL may serves as the database server which may manages the database 156.

Figure 9:
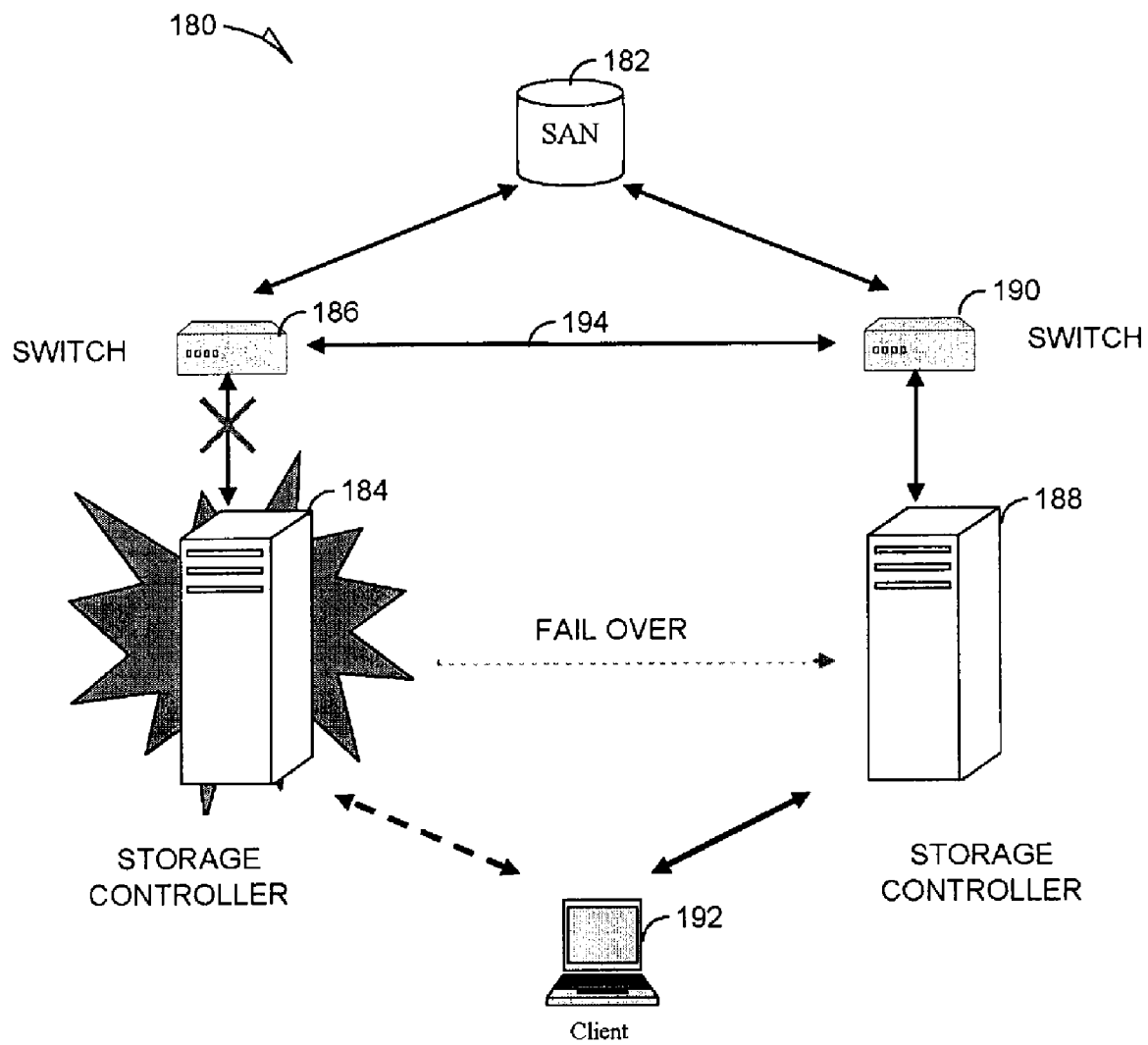
FIG. 9 shows an example failover scenario from an active machine to a standby machine.

In an example embodiment, two example high-availability scenarios may be considered. The first may be a Warm Failover scenario in which the standby machine or storage controller (e.g., slave machine) is up and running, but the services are not permanently on the standby or slave machine, when the active machine (or master machine) fails, the fail-over to the standby may occur automatically, without human intervention. However the clients (e.g., running client enterprise applications) usually have to reconnect and the current transaction may be lost. The second example scenario may be a Hot Fail-over scenario in which services are running on both the active and the standby machines (or any other machines that assist in high availability). Multiple instances in a cluster may be provided, for example, in a multi-master update-everywhere mode and client requests can be directed to the multiple instances. In an example embodiment, the methods and systems described herein may use an active/passive replication model in a warm fail-over scenario to provide high availability to shared data. An example failover in a system 180 is shown schematically in FIG. 9. The failover scenario shown in FIG. 9 shows only a single SAN 182 and a single client 192 and thus may describe a minimum failover system. The SAN 182 is connected to a master or active storage controller 184 via a switch 186, and a slave or standby storage controller 188 via a switch 190. It should be noted that any number of clients of clients may be provided and that the SAN 182 may comprise any number of databases (both local and/or distributed), switches, and storage controllers. In the example system 180 the standby storage controller 188 may take over when the active storage controller 184 fails. The standby storage controller 190 may then assume the role of the active storage controller and the active storage controller 186 may then assume the role of the standby storage controller.

In an example embodiment, only one of the storage controllers 184, 188 may actively processes requests from the clients (e.g., client 192) at any given time. The client 192 need not know which storage controller (e.g., server) it is communicating with. The client 192 may access the storage controllers 184, 188 through a virtual IP address (as described further below with reference to FIG. 10). The failover functionality described herein by way of example is intended to include the movement or transferal of any applications running on the storage controller, and all (or any) of its dependent services and resources, from one system (e.g., a server implementing an active or master storage controller) to another system (e.g., a server implementing a standby or slave storage controller) in the event of hardware failure (including any malfunction), component failure, system failure, virtual server application failure, dependent services failure, or database server failure.

Example Heartbeat Functionality

In an example embodiment, the storage controller (e.g., the storage controllers 184, 188 (including any further storage controller(s) that may be provided) may monitor operation of each other. In an example embodiment, Heartbeat software may be utilized. Heartbeat software is a piece of software that provides high availability features such as monitoring the availability of the machines in a cluster, transferring the virtual IP addresses in the event of failures, starting and stopping services, or the like. The example Heartbeat software may ship as part of various versions of Linux.

In an example embodiment, the Heartbeat software running on the standby storage controller 190 (e.g., slave server) may periodically check operation of the active or master storage controller 186 (e.g., master server) by listening to its heartbeats sent via connections between them (see arrow 194 in FIG. 9). In case the active or master storage controller fails, the standby or slave storage controller may not receive the heartbeats from the master and may then, for example, take over the virtual IP addresses and services offered by the master.

Figure 10:
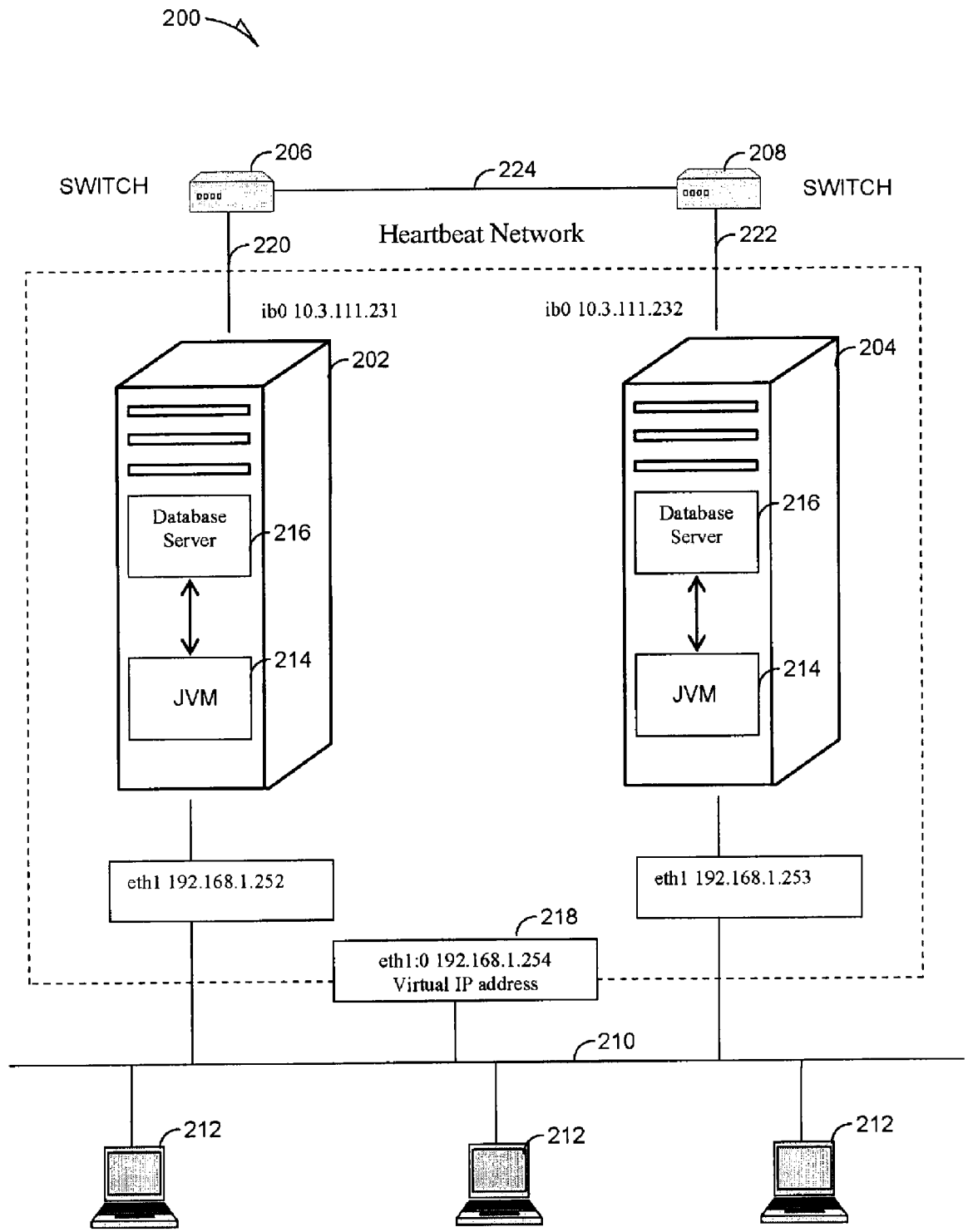
FIG. 10 shows a system, in accordance with an example embodiment, to provide high availability of shared data.

FIG. 10 shows a system 200, in accordance with an example embodiment, to provide high availability of shared data. Although the system 200 is shown to include a first and a second storage controller 202, 204, any number of storage controllers may be provided. Likewise, the system 200 is shown to include a first and a second switch 206, 208, any number of switches may be provided. The first and second storage controllers 202, 204 are connected via a network 210 to a plurality of clients 212 (only three of which are shown by way of example).

The system 200 is shown to be deployed by way of example in a virtual server environment. However, it is to be noted that it may also deployed in a non-virtual environment. In the system 200, a first active node is defined by the first storage controller 202 (e.g., a first VFrame director) and a second node is defined by the second storage controller 204 (e.g., a second VFrame director). The first storage controller 202 may be the active storage controller and the second storage controller 204 may be a standby or passive storage controller. When each node is a VFrame Director, the node may run both a VFrame application within a Java Virtual Machine (JVM) 214 and a database server 216 that manages the data repository (e.g., a VFrame data repository). In an example embodiment, the storage controller 202 may be a master node and storage controller 204 may be a slave node. The network 210 is shown by way of example to be an Ethernet network with an example virtual IP address 218 of 192.168.1.254 (which may be the floating IP address). In use, requests from the browsers provided on the client machines 212 may be made through the virtual IP address 218. In an example embodiment, the two storage controller 202, 204 are perceived by the user as one single director with one virtual address 218. The master storage controller (storage controller 202 in the given example) may listen to the virtual IP address 218. However, when the master storage controller 202 fails this listening functionality is transferred to the slave storage controller 204. Thus, when the master node fails, the standby node takes over the service and the virtual IP address. In an example embodiment, when the master node comes back online again, it may act as the stand-by node.

As described herein, the standby (or slave) storage controller may monitor operation of the active storage controller. In an example embodiment, heartbeat functionality may be utilized to perform the monitoring but this requires one or more media paths between the two machines or storage controller. For example, this monitoring path may be a serial path via a null modem cable or an Ethernet path via a crossover cable. A second serial/null modem connection or a second network interface card (NIC)/crossover connection to each storage controller may be provided to avoid a single point of failure. In an example embodiment, InfiniBand connection may be used to perform the monitoring (or monitor the heartbeat functionality). Each storage controller 202, 204 may be connected to a switch 206, 208 via InfiniBand links 220, 222 respectively. The two switches 206, 208 may be connected using an InfiniBand link 224 (which may be a dual connection to avoid a single point of failure).

Example Monitoring Tool

The example Heartbeat software may run on both the storage controllers 202, 204 (e.g., functioning as master and slave machines). The Heartbeat software may monitor that the two storage controllers 202, 204 can communicate with each other. If the machine acting as the master storage controller fails, then Heartbeat software may initiate the take-over by the slave storage controller.

However, in an example embodiment, the Heartbeat software may not monitor the health of a process running on the storage controller. In the virtual server environment described herein by way of example the process running on the storage controller may include VFrame software components such as the VFrame application, a database server, a Dynamic Host Configuration Protocol (DHCP) server, and a Trivial File Transfer Protocol (TFTP) server. DHCP is a protocol for assigning dynamic IP addresses to devices on a network. With dynamic addressing, a device can have a different IP address every time it connects to the network. In DHCP, a device's IP address can change while it is still connected to a network. TFTP uses the User Datagram Protocol (UDP) and may be used by servers to boot diskless workstations, X-terminals, and routers.

A monitoring tool (MON) may be used to monitor storage controller components (e.g., VFrame software components), to check whether they are running and answering requests, and to check if any of the components fails. In an example embodiment, the monitoring tool may be an alert management tool used to monitor service availability and trigger alerts upon failure detection. In an example embodiment, each of the software components monitored by the monitoring tool may include two scripts written in Perl; a first monitor script may test the condition of the component and detect failure; second alert script may define one or more actions that get triggered upon failure. When, for example, heartbeat software starts on the master or active storage controller, it may start selected software components (e.g., VFrame software components) and the monitoring tool software. The monitoring tool may run on the master or active storage controller and monitor operation (e.g., the health) of the selected software components (e.g., VFrame software components) on the master or active storage controller.

If the monitoring tool detects that one of software components (e.g., VFrame software components) is down on the active storage controller, then it may invoke one or more corresponding alert scripts which initiates a fail-over. The alert scripts may gracefully shutdown the Heartbeat software running on the failed storage controller (e.g., storage controllers 184 or 202 in FIG. 9 or 10). These actions may result in the fail-over to the slave storage controller (e.g., storage controllers 190 or 204). The software components (e.g., the VFrame software components) and the monitoring tool may then be started on the standby or slave storage controller by the Heartbeat software running on the standby or slave storage controller. In an example embodiment, the Heartbeat software on the failed storage controller may then brought back on after the problem causing the failure on the failed storage controller has been resolved and the storage controller may once again assume a role as a standby storage controller.

In an example virtual server environment, the monitoring tool may monitor the following in a VFrame high availability solution: the PostgreSQL process, a VFrame application, and access to shared external VFrame data. In order to monitor if the VFrame director has access to the VFrame data that may reside on the external storage, the monitor may check/proc/scsi/srp for the presence of the target providing access to the VFrame Data Lun. If access to a target is lost by either a chassis reboot or the storage being disconnected from the chassis, the failure may be detected by this check to/proc/scsi/srp. In an example embodiment, a Watchdog application may be run to detect a failure of the monitoring tool and initiate a failover to the other storage controller if the monitoring tool fails. In an example embodiment, if the monitoring tool is unable to send connect requests to the Watchdog then it may assume that the Watchdog has failed and the monitoring tool may then initiate a failover.

In an example virtualized server environment, the VFrame Director may use a PostgreSQL database repository to persist critical data as well as for Enterprise Java Bean (EJB) persistence. A PostgreSQL database server (see database server 202) may run on the master storage controller (e.g., storage controller 202) and be the active one. When a database server failure is detected by the monitoring tool, the entire VFrame system may fail-over the slave storage controller (e.g., storage controller 204).

The data may be a single point of failure. In an example embodiment, VFrame data repository may be provided by a Storage Area Networks (SAN) which may provide reliable high availability of the data. For higher availability of the data, a replicated SAN can be used.

In the example system 180 is shown in FIG. 9, two storage controllers 184, 188 that are connected via two switches 186, 190 to the external storage provided by the SAN 182. The master storage controller (e.g., the storage controller 184) when active may have access to the shared data on the SAN 182. When the monitoring tool detects a failure on master the storage controller 184, a failover to the storage controller 188 may be initiated. The Watchdog, the monitoring tool, storage controller software, and a database server of the storage controller 184 may be gracefully shut down. An application may be executed to remove the link to the storage controller software data (e.g., VFrame data) from a local disk to an external shared disk, unmount the partition, unload a SCSI RDMA Protocol (SRP) driver, and restrict access to the database Logical Unit Numbers (LUNs) by configuring the fibre channel gateways. A LUN provides a unique identifier used on a SCSI bus to distinguish between devices that share the same bus. Further, the storage controller (e.g., VFrame) software components may be gracefully shutdown, resources cleaned up, and the Heartbeat may be shutdown on the master. These actions result in the fail-over to the slave storage controller 188, and the Heartbeat software on the slave director may bring up a high availability start application, PostgreSQL, a VFrame application, a Watchdog, and the monitoring tool on the slave storage controller 188. The high availability start application may perform the action of "fencing off" the other storage controller 188 machine from accessing the shared storage on the SAN 182 and providing access to itself by configuring the initiator for itself, the SRP driver may be loaded, and data on the partition may be mounted. In an example embodiment, the VFrame may maintain the database data, VFrame application logs and the image depot on the shared external storage. While the failed controller attempts to gracefully shutdown, the graceful shutdown is not required to succeed since the high availability start application will fence off the failed controller.

Figure 11:
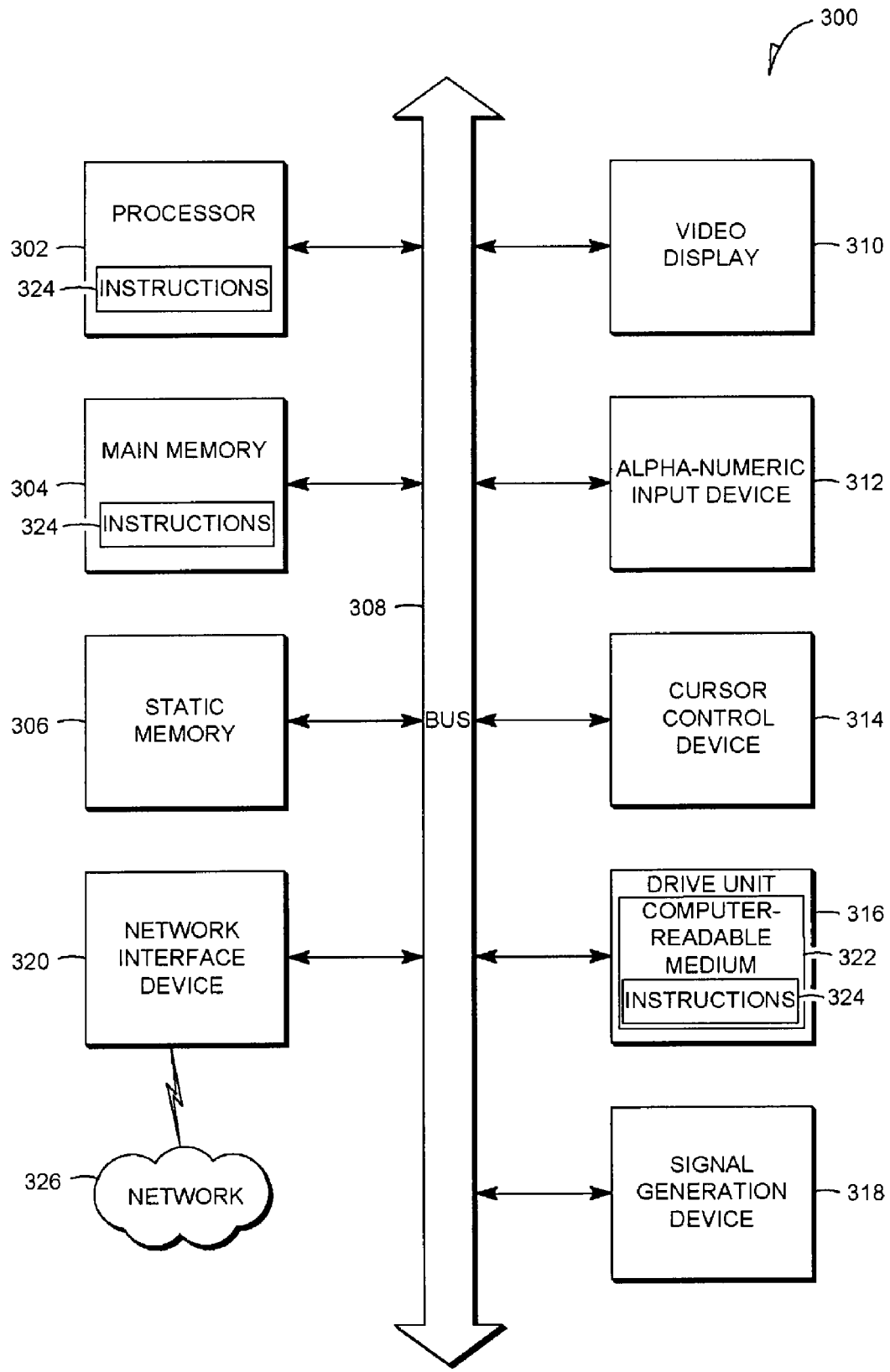
FIG. 11 shows a diagrammatic representation of machine in the example form of the computer system within which a set of instructions, for causing the machine to perform any one of the methodologies discussed herein, may be executed.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and a system to provide high availability to shared data are described. Although the present invention has been described with reference to specific exemplary embodiments (e.g., in a virtual server environment), it will be evident that various modifications and changes may be made to these embodiments without departing from the broader spirit and scope of the invention. Accordingly, the specification and drawings are to be regarded in an illustrative rather than a restrictive sense.

The invention claimed is:

1. A data storage system comprising:
   a data repository to store data;
   an active storage controller coupled to the data repository via at least one network device;
   a standby storage controller coupled to the active storage controller and the data repository via the at least one network device, the standby storage controller configured to monitor an active status of the active storage controller to detect failover of the active storage controller, the monitoring to check whether the active storage controller is running and answering requests, the monitoring neither requiring an acknowledgement from the active storage controller nor a status message to be generated by the active storage controller; and
   at least one communications link to couple at least one client to the active storage controller and to the standby storage controller to access the data in the data repository via the active storage controller and the standby storage controller, the standby storage controller being configured to become active and at least partially inhibit network connectivity of the active storage controller during the failover, without requiring a host computer to either control the failover or provide switching operations during the failover.

2. The system of claim 1, wherein the active storage controller is a server actively providing the at least one client access to the data repository.

3. The system of claim 1, wherein the active storage controller and the standby storage controller are provided with a common virtual IP address to provide network connectivity to the at least one client.

4. The system of claim 1, further comprising a Storage Area Network providing the data repository, the active storage controller and the standby storage controller each being coupled to the Storage Area Network via at least one switch.

5. The system of claim 4, wherein the at least one switch comprises:
   at least one fibre channel gateway to provide network connectivity between the at least one switch and the Storage Area Network; and
   at least two Target Channel Adaptors to provide network connectivity to a Host Channel Adaptor of each of the active storage controller and the standby storage controller.

6. The system of claim 5, wherein an initiator is created on the at least one fibre channel gateway to associate a Globally Unique Identifier of the Host Channel Adaptor and a fibre channel addresses of each switch.

7. The system of claim 6, wherein the fibre channel addresses comprise a World Wide Node Name (WWNN) or a World Wide Port Name (WWPN).

8. The system of claim 5, wherein to at least partially inhibit network connectivity of the active storage controller in the event of the failover comprises modifying a zoning configuration on the switch associated with the active storage controller.

9. The system of claim 8, wherein modifying the zoning configuration comprises removing an address of the active storage controller from a defined zone.

10. The system of claim 1, wherein the active storage controller and the standby storage controller each comprises a failover module to monitor operation of the other storage controller.

11. The system of claim 1, which includes a Network File System server connected to the data repository, the active storage controller and the standby storage controller each being connected to the Network File System server via an Ethernet switch.

12. The system of claim 11, wherein the switches are configured in a Virtual Local Area Network via which the active storage controller and the standby storage controller access the Network File System server.

13. The system as claimed in claim 12, wherein to at least partially inhibit network connectivity of the active storage controller in the event of the failover comprises removing a port of the Ethernet switch to which the active storage controller is connected.

14. A method of managing a data repository to store data accessible by at least one client machine, the method comprising:
   providing the at least one client with access to the data repository through an active storage controller, the active storage controller being communicatively coupled via at least one network device to the data repository;
   monitoring, by a standby storage controller, an active status of the active storage controller to identify at least a partial failure of the active storage controller, the monitoring to check whether the active storage controller is running and answering requests, the monitoring neither requiring an acknowledgement from the active storage controller to the standby storage controller nor a status message to be generated by the active storage controller; and
   based on a determination that the active storage controller at least partially failed, providing a failover, the failover including:
      modifying network connectivity of the active storage controller utilizing the standby storage controller; and
      configuring network connectivity of the standby storage controller to provide the at least one client with access to the data repository without requiring a host computer to either control the failover or provide switching operations during the failover.

15. The method of claim 14, further comprising providing the active and standby storage controllers with a common virtual Internet Protocol (IP) address to provide the network connectivity to the at least one client.

16. The method of claim 14, further comprising associating a Globally Unique Identifier of a Host Channel Adaptor of a server of the data repository with one or more fibre channel addresses of the network device.

17. The method of claim 14, wherein to modify the network connectivity of the standby storage controller comprises removing a port the of an Ethernet switch to which the active storage controller is connected.

18. The method of claim 14, wherein to modify network connectivity of the active storage controller comprises modifying a zoning configuration on a switch associated with the active storage controller.

19. The method of claim 18, wherein modifying the zoning configuration comprises removing an address of the active storage controller from a defined zone.

20. A non-transitory machine-readable storage medium containing instructions that, when executed by one or more processors, perform a method of managing a data repository to store data accessible by at least one client machine, the method comprising:
   providing the at least one client machine with access to the data repository through an active storage controller, the active storage controller being communicatively coupled via at least one network device to the data repository;
   monitoring, by a standby storage controller, an active status of the active storage controller to identify at least a partial failure of the active storage controller, the monitoring to check whether the active storage controller is running and answering requests, the monitoring neither requiring an acknowledgement from the active storage controller to the standby storage controller nor a status message to be generated by the active storage controller; and
   based on a determination that the active storage controller at least partially failed, providing a failover, the failover including:
      modifying network connectivity of the active storage controller utilizing the standby storage controller; and
      configuring network connectivity of the standby storage controller to provide the at least one client with access to the data repository without requiring a host computer to either control the failover or provide switching operations during the failover.

* * * * *